UNITED STATES PATENT OFFICE 2,660,569

HYDROGEN CHLORIDE GAS HARDENING OF METAL OXIDE POWDER

Otto Reitlinger, Kew Gardens, N. Y.

No Drawing. Application September 26, 1949, Serial No. 117,941

6 Claims. (Cl. 252—441)

This invention relates to a process for increasing the resistance against impact, and for hardening of bodies which are assembled and shaped out of loose powder, without any solid cores, without any adhesives or fluxes, and by applying only a very slight pressure.

In my co-pending applications, Serial No. 651,979 now abandoned and Serial No. 712,047, now U. S. Patent No. 2,488,560 issued November 22, 1949, I have described a process for assembling very fine powder particles in a plurality of layers enveloping the carriers to the surface of which the innermost layers are bonded by the adhesive forces of the vapors which are adsorbed by the pretreated carriers and by the powder layers during the state of their formation.

The critical features of this process are: The exclusion of any pressure, and the exclusion of any adhesive or flux for assembling said powder layers.

The advantages of the use of said powder multi-layers for catalytic reactions have been described in my above cited co-pending applications. They are:

(a) The magnitude of the size of the openings of the macropores of the catalytic powder multi-layer can be selected by choosing the size of the powder particles. The thus predeterminable size of the openings of the macro-pores can be arranged to be in the range of the mean free path of the molecules of the reacting gases under the conditions of the reaction. These are the optimum conditions because if the openings of the macro-pores are smaller, the diffusion of the reactants into these pores and the diffusion of the reaction products out of these pores is impaired while the gas flow passes along these powder layers. Vice versa, if the openings of the macro-pores are larger than this minimum size the inner active surface of the powder multi-layer, formed by the surface of the pores, is unnecessarily reduced.

(b) The surface of the walls of the macro-, and micro-pores of the multi-layers is formed only by active material, and is not interspersed with inactive or less active zones, and wherever the molecules of the reacting gases contact this inner surface they can react.

(c) The exclusion of any adhesive or flux for assembling and forming the multi-layers precludes the clogging of the pores and the entering of inactive material into said pores by absorption.

(d) By this arrangement the catalytic efficiency of catalytic substance is increased manifold, for the same reaction, and under the same conditions of reaction, over the efficiency of the same substances prepared by any of the methods hitherto known.

The increase in efficiency of these new contact masses is caused by their ability to allow the gases to diffuse freely throughout the powder layers, and the formation of these layers depends on their ability to adsorb such vapors which cause the cohesion of the powder particles and the adhesion of the innermost layers of same to the support to which an intermediate layer is applied which adsorbs the same vapors.

Thus, the formation of these powder multi-layers is closely related to the capability of the constituents from which the powder particles are formed to adsorb vapors.

It is known in the art that ferric oxide, provided that it has not been previously heated to too high a temperature, adsorbs many vapors much better than "activated carbon." Therefore, it would be logical to use ferric oxide instead of "activated carbon" as an adsorbent. Hitherto, this could be done only by impregnating porous carriers with ferric oxide, or by applying the same in the known manner to such carriers.

It is known in the art, as stated by E. Wicke, Kolloid Zt. 86, 1939, p. 171, and referred to by Stephen Brunauer in his book Physical Adsorption, Princeton University Press, 1943, p. 375, "that the rate of adsorption is determined by the macro-pores. If pores of large diameters alternate with narrow pores, the distance through which molecules must travel in the micro-pores is shortened, and the rate of adsorption becomes faster." By assembling powder particles to powder multi-layers or to greater aggregates these theoretical conditions for the physical structure of a good adsorbent are met. The macro-pores of such structures are the interstices between these powder particles as explained sub (a) supra. They serve for the diffusion of the gases throughout the powder multi-layers or the aggregates assembled from the powder. The micro-pores are the very small pores in each powder particle and thus open into the macro-pores. The molecules travel at the rate of diffusion through the macro-pores formed by the powder particles and are adsorbed by the micro-pores in these powder particles.

Aggregates loosely assembled from powder particles and subsequently hardened by the method of this invention, when filled into a reactor for the catalytic activation of chemical reactions in fluids or for adsorption processes, form three systems of intercommunicating channels of widely differing magnitude and therefore for completely differing purposes. The first system is a lattice or network of communicating channels formed by the individual aggregates and serves to control the hydrostatic conditions for the regular and homogeneous flow of the fluids through said reactor. The second system is a lattice or network of communicating channels formed by the individual powder particles. These channels are the interstices between the individual powder particles and are the macro-pores of the powder aggregates. The mean diameter of these macro-pores is arranged to be at least of the magnitude of the mean free path of the molecules of the gases under the conditions of the reaction or the adsorption process. The channels of the second system, which are the macro-pores of the aggregates, communicate with the channels of the first lattice and serve for the diffusion of the gases throughout the powder aggregates. The channels of the third system are the micro-pores in the individual powder particles. They open into the macro-pores of the powder aggregates or into the channels of the second lattice and serve for the adsorption of the gases or vapors and for the catalytic activation of chemical reactions.

The powder multi-layers of metal oxide powder and the aggregates of said powder, which have been described in my above cited co-pending patent application are not only advantageous for catalytic processes but also for the adsorption of vapors. The same criterion which is valid for catalysts for gas reactions, i. e., that the diffusion of the gases throughout the catalyst must not be impaired, is valid also for a good adsorbent, i. e., if the gases are to be quickly adsorbed their diffusion throughout the adsorbent must not be impaired. Therefore, the size of the openings of the macro-pores of good adsorbents must be of about the magnitude of the mean free path of the molecules of the gases for the conditions under which they are adsorbed.

However, while for catalytic reactions the criterion is valid that the products of reaction must effuse at the same rate as the reactants from which they are formed diffuse, there is valid for adsorption processes the criterion that the adsorbing masses must have a sufficient capacity for retaining the adsorbed vapors to adsorb them completely out of the passing gases. Thus, while for catalytic processes, a powder multi-layer of the thickness of fractions of 1 mm. will be sufficient, for processes of adsorption aggregate of greater depth will be needed. These aggregates of powder must have a sufficient capacity for adsorbing great quantities of the vapors, and to release them subsequently at higher temperatures in the known manner by superheated steam.

The principal object of this invention is to provide a method to form aggregates from powder particles without substantially decreasing the size of the macro-pores or interstices between these particles which precludes the application of great pressures in their formation. Another object of this invention is to provide a method to increase the impact resistance of these aggregates without substantially decreasing the size of the pores. As described in my co-pending applications, Serial No. 651,979 and Serial No. 712,047, a treatment with hydrogen chloride and oxygen in a temperature range in which the selected metal oxide powders are catalysts for the Deacon reaction even to the smallest extent is an appropriate means for attaining the increase of the resistance against impact of such metal oxide powder multi-layers without substantially reducing the size of their pores and without reducing substantially the area of their active inner surface.

It is known in the art that the oxides and/or chlorides, and the oxide-forming compounds (e. g. the carbonates), of the following metals are catalysts for the Deacon reaction. Titanium, Vanadium, Chromium, Manganese, Iron, Cobalt, and Copper. These metals have the atomic numbers 22, 23, 24, 25, 26, 27, and 29.

These metals, their oxides and oxide forming compounds, and their chlorides when subjected to the action of a gas mixture containing hydrogen chloride and oxygen at the temperature range at which they are catalysts for the oxidation reaction of hydrogen chloride (the Deacon reaction), generally between 200° C. and 750° C., they are transformed into their oxy chlorides, which oxy chlorides are the stable compounds under the conditions of the Deacon reaction. It is known that these oxy chlorides are transformed into chlorides when oxygen is excluded from above gas mixture containing hydrogen chloride, and that they are transformed into the oxides when hydrogen chloride is missing in above gas mixture containing oxygen. The oxides are retransformed into oxy chlorides when hydrogen chloride is readmixed to the heated gas containing oxygen, and the chlorides are also retransformed into the oxy chlorides when oxygen is readmixed to the heated gas containing hydrogen chloride.

It is most possible that the above described formation of the oxy chlorides of these metals is responsible for the phenomenon that adjacent metal, metal oxide, and metal chloride powder particles are made to adhere, or to cohere, without any adhesive or flux, without the application of any pressure, and far below the temperature of sintering, when subjected to the action of a gas mixture containing hydrogen chloride and oxygen in the temperature range at which they are catalysts for the oxidation of hydrogen chloride with oxygen to chlorine and water (the Deacon reaction).

The chlorides of these metals are volatile at the temperatures at which they are catalysts for the Deacon reaction.

Therefore, the initial chloride formation or the chloride formation as an intermediary step with subsequent transformation into oxy chloride could be the explanation for the formation of small bridges or linkages between adjacent powder particles at their contact points.

This explanation is also based on the following facts:

(1) When first hydrogen chloride containing gases which do not contain oxygen are passed over these metal or metal oxide powder particles at the given temperature range and subsequently oxygen containing gases which do not contain hydrogen chloride are passed over them at the same temperature range, or vice versa if oxygen containing gases which do not contain hydrogen chloride are passed at the same temperature range over the chloride particles of these metals, the same hardening effect of these powder multi-layers is experienced.

(2) When first chlorine containing gases which do not contain oxygen are passed over these metal oxide powder particles at the given temperature range and subsequently oxygen containing gases which do not contain chlorine are passed over them at the same temperature range, or when a gas mixture containing chlorine and oxygen is passed over the metal or metal oxide powder particles at the same temperature range the same increase of the resistance against impact of such metal and metal oxide powder multilayers is realised.

Quite evidently it is immaterial to the effect of the described hardening of the powder multilayers of above metals and their oxides whether the chlorine is formed by these metals and/or their oxides by catalising the Deacon reaction or if the chlorine is developed inside said powder multi-layers or introduced as such together with oxygen or in alternative steps with oxygen.

Since the chlorides of these metals are volatile at the given temperature range parts of these powder multi-layers will evaporate when subjected in the described alternative steps to the action of heated hydrogen chloride alone. Therefore, I prefer to subject these powder multilayers to the action of a gas mixture containing hydrogen chloride and oxygen in excess of the stoichiometric proportion at the temperatures at which the intermediary formed volatile chloride is transformed into oxy chloride.

This method has the great advantage of bringing about coherence or baking together of small particles of metal oxide powders at much lower temperatures than are necessary to sinter same by heat treatment only. Another feature of this treatment at relatively low temperatures is that only slight pressure is needed to cause the cohesion of the powder particles, and that the bodies to which they are shaped have almost the same original great porosity as aggregates built up loosely from particles of powder.

It will be understood that this method of causing the cohesion of metal oxide particles is not confined to the preparation of catalytically active structures, but can be used for any other purpose where such porous bodies of metal oxides may be used advantageously.

This method also makes possible the preparation of shaped bodies which are built up throughout from powder particles without supporting cores. Such aggregates of powder can be used not only for catalytic reactions, but also as adsorbents for adsorption processes.

This method is not confined to aggregates formed of powder particles of metal oxides only. Powder particles of metals and of metal compounds other than oxides can be admixed to the powder of metal oxide or oxides. Metal compounds forming metal oxides on heating must be considered in this respect as behaving like oxides, since they are converted into oxides by the hardening process with hydrogen chloride and oxygen at elevated temperatures.

The preparation of aggregates of powder particles containing metal oxides and the strengthening of these aggregates will now be described in greater detail by means of the following examples. All parts are by weight unless otherwise stated. It will be understood that the invention is not limited to those specific embodiments and particular data given since the examples are given primarily for purposes of illustration and the invention is to be construed as broadly as the appended claims permit.

Example I

A fine powder of ferric oxide, for instance, so fine that 95 percent of same passes through a screen of 325 mesh, is shaped into spheres of about 5 mm. diameter by employing low pressures as, for example, 50 lbs. per square inch, or by means of the "Spheronizing Equipment" provided by James Russel Eng. Works, Inc., Boston, or by other similar equipment. These spheres have no mechanical strength. If they drop from a height of 10 cm. they disintegrate readily.

A slightly inclined tube of Pyrex glass or a steel tube coated with corrosive resistant cement is carefully loaded with these spheres. The tube is heated at a temperature of about 490° C. A gas mixture containing about 10 parts by volume of air and about 4 parts by volume of hydrogen chloride which has been preheated to about 440° C. is passed through this tube for a period of about 48 hours. After cooling, these spheres are removed from the reactor.

If, after this treatment, they are dropped from a height of about 20 cm. they no longer disintegrate.

Example II

Powder of copper oxide of the same fineness as described in the previous Example I, is shaped into spheres of about 5 mm. diameter by employing 100 lbs. per square inch pressure or by the same equipment as previously described.

A slightly inclined tube of Pyrex glass or a steel tube coated with corrosive resistant cement is carefully loaded with these spheres. The tube is heated at a temperature of about 470° C. A gas mixture containing about 1 part by volume of oxygen and about 4 parts by volume of hydrogen chloride is passed through this tube for a period of about 36 hours. After cooling, these spheres are removed from the reactor.

The same increase in mechanical strength is attained by the above treatment. If, after this treatment, these spheres are dropped from a height of about 20 cm. they no longer disintegrate into powder.

Example III

A vertical tube of Pyrex glass or a steel tube coated with corrosive resistant cement is provided with a perforated partition or a screen the plane of which forms with the axis of the tube an angle of about 90°. This plate or screen is covered with glass wool or with another inorganic fiber material, as asbestos or mineral wool, on top of which a second perforated plate or screen is laid. This second perforated plate or screen is covered with a layer of about ½ inch height of ferric oxide powder, for instance so fine that 90 percent of same passes through a screen of 270 mesh. The tube is heated to about 490° C. A gas mixture containing about ten parts by volume of air and about four parts by volume of hydrogen chloride which has been preheated to about 440° C. is introduced into this tube under a pressure of about two atm. abs. Under this pressure this gas mixture diffuses slowly through the ferric oxide powder layer and the exit gases contain chlorine. This treatment is continued for a period of about 60 hours. Subsequently a gas mixture containing about 10 parts by volume of air and about 4 parts by volume of methane, ethane, or ethylene, or any other suitable hydrocarbon which has been preheated to about 440° C. is introduced into this tube under a pressure of about two atm. abs. while the temperature of the tube is maintained at about 490° C. The gases diffusing through the powder layer now contain the chlorination products of the introduced hydrocarbons. This treatment is continued until air introduced into this tube under the same temperature and pressure diffuses through the powder layer without containing chlorine in the exit gases.

The original powder layer forms after these treatments a solid block which can be removed from the tube as such or disintegrated to grains. These grains or the entire block are formed of ferric oxide particles which are slightly baked together. If these grains are dropped from a height of about 20 cm. they do not disintegrate.

These grains of ferric oxide powder have almost the same porosity as the powder layer of the same powder from which these grains were formed.

These grains can be filled into a reactor and can be used with advantage for catalytic chemical reactions.

However, they are especially useful for the adsorption of vapors because the original porosity of the powder layers from which they have been formed has been maintained.

*Example IV*

About 30 parts of ferric oxide powder, 30 parts of copper oxide powder, and 30 parts of copper powder, all of the same fineness as described in the Example I, are thoroughly mixed and subsequently shaped into spheres of about 3 mm. diameter by employing about 50 lbs. per square inch pressure or by employing the same equipment as previously described.

These spheres are carefully loaded into the same reactor as used in the Examples I and II and heated to about 460° C. whereupon a gas mixture containing about 9 parts by volume of air and about 4 parts by volume of hydrogen chloride is passed through the reactor for a period of 36 hours. After cooling these spheres are removed from the reactor.

The same increase in mechanical strength is experienced. If, after this treatment, these spheres are dropped from a height of about 20 cm. they no longer disintegrate.

*Example V*

About 20 parts of iron carbonate powder, 30 parts of ferric oxide powder, 20 parts of copper oxide powder, 15 parts of chromium sesquioxide powder and 15 parts of iron powder, all of the same fineness and passing through a sieve of 230 mesh but being retained by a sieve of 270 mesh, are thoroughly mixed and subsequently shaped into spheres of about 3 mm. diameter by employing about 50 lbs. per square inch pressure or by employing the same equipment as employed in Example I.

The same reactor as used in Example I is carefully loaded with these spheres. The reactor is heated to about 500° C. whereupon a gas mixture containing 1½ parts by volume of oxygen and about 2 parts by volume of hydrogen chloride which has been preheated to 400° C. is passed through this reactor for a period of about 48 hours. After cooling, these spheres are removed from the reactor.

If, after this treatment, they are dropped from a height of about 20 cm. they no longer disintegrate.

By subjecting the metal oxides which are catalysts for the Deacon reaction to the action of hydrogen chloride and oxygen, the metal oxides combine with chloride and are partially converted to metal oxychloride. Therefore, if the thus treated metal oxide powders have to be used in processes where chlorine is detrimental, the chlorine has to be removed prior to their use. This can readily be attained by passing a stream of oxygen or air over the aggregates at about 490° C. until the exit gases no longer contain chlorine. This step can be shortened by admixing methane or another suitable hydrocarbon with the stream of air.

These spheres of cohered metal oxide powder can be used as catalysts for the reactions for which the metal oxide or the metal oxides of which they are composed are appropriate; they can also be subjected to a further treatment with a reducing gas at elevated temperatures until the metal oxide is substantially reduced to metal, and can subsequently serve as catalysts for the reactions for which the metal or the metals of which they are then composed are appropriate.

For the reasons explained hereinbefore, powder aggregates as described in the examples are more appropriate for adsorption processes than the thin powder multi-layers as obtained according to the method described in my above cited co-pending patent applications, because the capacity for adsorbing and retaining the adsorbed vapors is many times that of the powder multi-layers with which the supporting cores are covered.

The term "oxygen" as used throughout the specification and the claims is meant to cover not only oxygen but also oxygen containing gases, preferably air, and the term "hydrogen chloride" includes hydrogen chloride, moist or dry. All components of the gaseous mixtures may be used pure or mixed with other gases.

This application is a continuation-in-part of my co-pending application, Serial No. 712,047, filed November 25, 1946, now Patent No. 2,488,560, which is a continuation-in-part of my co-pending application, Serial No. 651,979, filed March 4, 1946, and contains subject matter originally disclosed in both of said applications.

What I claim is:

1. A method of forming porous coherent metal oxide granules comprising the step of causing gaseous hydrogen chloride and oxygen to diffuse slowly through a column containing powdered oxides of metals selected from the group consisting of titanium, vanadium, chromium, manganese, iron, cobalt and copper in the absence of binding agents at temperatures between 300 and 700° C. until the powder particles cohere to each other and then disintegrating said coherent column into granules of smaller size.

2. A method of forming mechanically resistant porous powder aggregates comprising assembling powder particles consisting essentially of at least one metal compound selected from the group consisting of metal oxides and metal compounds which on heating form metal oxide, the metal of said compound being selected from the group consisting of titanium, vanadium, chromium, manganese, iron, cobalt and copper, in the absence of binding agents by applying pressures not substantially exceeding 100 lbs. per square inch and sufficient only to make the particles cohere, and then hardening the powder aggregates by treatment with gaseous hydrogen chloride and oxygen at temperatures between 300 and 700° C.

3. A method according to claim 2 wherein the mechanically resistant aggregates are further heated in an oxidizing atmosphere so as to convert oxychlorides formed in the hardening step into the oxides.

4. A method of forming mechanically resistant porous iron oxide powder aggregates comprising assembling powder particles consisting essentially of an iron compound selected from the group consisting of iron oxide and iron compounds which on heating form iron oxide, in the absence of binding agents by applying to said particles a pressure not substantially exceeding 100 lbs. per square inch and sufficient only to make the particles cohere, and then hardening the iron oxide powder aggregates by treatment with gaseous hydrogen chloride and oxygen at temperatures between 300 and 700° C.

5. A method of forming mechanically resistant porous metal powder aggregates comprising assembling powder particles consisting essentially of at least one metal compound selected from the group consisting of metal oxides and metal compounds which on heating form metal oxide, the metal of said compound being selected from the group consisting of iron, cobalt, and copper, in the absence of bonding agents by applying to said particles a pressure not substantially exceeding 100 lbs. per square inch and sufficient only to make the powder particles cohere, then hardening the powder aggregates by treatment with gaseous hydrogen chloride and oxygen at temperatures between 300 and 700° C., and finally treating the aggregates with a reducing gas until the metal oxides are substantially reduced to metal.

6. A method as defined in claim 5 wherein the hardened metal oxide powder aggregates are heated in an oxidizing atmosphere so as to convert oxychlorides formed in the hardening step into the oxides, and treated with a reducing gas.

OTTO REITLINGER.

References Cited in the file of this patent

UNITED STATES PATENTS

| Number | Name | Date |
| --- | --- | --- |
| 933,269 | Schumacher | Sept. 7, 1909 |
| 2,131,006 | Dean | Sept. 20, 1938 |
| 2,176,242 | Bowes | Oct. 17, 1939 |
| 2,191,981 | De Jahn | Feb. 27, 1940 |
| 2,306,665 | Schwarzkopf | Dec. 29, 1942 |
| 2,374,454 | Oliver | Apr. 24, 1945 |
| 2,411,873 | Firth | Dec. 3, 1946 |
| 2,413,492 | Firth | Dec. 31, 1946 |
| 2,445,648 | Truesdale | July 20, 1948 |
| 2,463,413 | Neel | Mar. 1, 1949 |
| 2,511,400 | De Jahn | June 13, 1950 |

FOREIGN PATENTS

| Number | Country | Date |
| --- | --- | --- |
| 66 | Great Britain | 1886 |
| 17,272 | Great Britain | 1889 |
| 583,809 | Great Britain | Dec. 31, 1946 |